United States Patent

[11] 3,607,981

[72] Inventor Roger E. Morris
  Cuyahoga Falls, Ohio
[21] Appl. No. 871,953
[22] Filed Oct. 28, 1969
[45] Patented Sept. 21, 1971
[73] Assignee The B.F. Goodrich Company
  New York, N.Y.

[54] NITRILE RUBBERS
  5 Claims, No Drawings
[52] U.S. Cl. ................................................. 260/879
[51] Int. Cl. ................................................. C08d 3/02
[50] Field of Search ........................................ 260/879,
  823, 32.4

[56] References Cited
OTHER REFERENCES
3,426,102 2/1969 Solak et al............... 260/879

Primary Examiner—Joseph L. Schofer
Assistant Examiner—Richard A. Gaither
Attorneys—J. Hughes Powell, Jr. and Ernest K. Bean

ABSTRACT: Improved nitrile rubbers that are readily processed, have an excellent balance of low temperature-oil swell properties and other good physical properties are prepared polymerizing a polar monomer as acrylonitrile or methacrylonitrile with a mixture of (1) an elastomer of a conjugated diene and a nitrile and (2) a polymer of a conjugated diene and a nitrile having a molecular weight below 20,000. This low molecular weight copolymer may also be liquid xanthate-, mercaptan- or carboyxl-terminated polymers.

NITRILE RUBBERS

BACKGROUND OF THE INVENTION

Nitrile rubbers, copolymers of butadiene-1,3 and acrylonitrile, are normally oil-resistant but when sufficient nitrile monomer is copolymerized to obtain better oil resistance, the low-temperature properties required for many applications are adversely affected, such copolymers often have high Mooney values and are difficult to process.

SUMMARY OF THE INVENTION

I have now found that a nitrile elastomer prepared by polymerizing acrylonitrile or methacrylonitrile with a mixture of an elastomeric copolymer of a conjugated diene and a nitrile and a liquid copolymer of a conjugated diene and a nitrile, having a molecular weight below about 20,000 provide a polymer retaining the low-temperature flexibility of the base elastomer and having an improved balance of low-temperature and oil swell properties, and are more readily processed compared to polymers containing the same amount of copolymerized acrylonitrile.

DETAILED DESCRIPTION

The first polymer required in this invention is an elastomeric copolymer of a diene, as butadiene-1,3 or isoprene and a nitrile, as acrylonitrile or methacrylonitrile. Normally, such copolymers contain about 5 to 40, preferably 10 to 30 weight percent of nitrile and about 60 to 95, preferably 70 to 90 weight percent diene. Other monomers may be used in addition to these two essential monomer of types that are well known to those skilled in the art to be copolymerizable with the nitrile and diene, generally vinylidene compounds containing a terminal $CH_2=C<$ grouping, and in amounts so that the diene is at least 50 percent of the final copolymer. Such other useful monomers include for example, a styrene, halostyrenes, vinyl acetate, vinylidene chloride, bis($\beta$-chloroethyl vinyl phosphonate), methyl methacrylate and the like. An elastomer is defined as a material that can be stretched at room temperature to at least twice its original length and after having been stretched and the stress removed, returns to approximately its original length in a short time. These elastomeric polymers normally have large rotor Mooney values at 212° F. of about 20 to about 125.

The second essential polymeric constituent of this invention are low-molecular weight polymers of dienes and nitriles essentially of the same type described above, except they have molecular weights below 20,000 and preferably below 5,000. These polymers normally are liquid and have no measurable large rotor Mooney value at 212° F. A useful range is from about 1,000 to about 10,000 molecular weight. The amount of the liquid or low-molecular weight copolymer used will be from about 5 to 40 percent of the total polymers and 95 to 60 weight percent of the elastomer. Excellent results have been obtained with 10 to 30 weight percent of the liquid and low-molecular weight copolymers.

The so-called liquid rubbers, low-molecular weight xanthate-terminated, mercaptan-terminated, hydroxyl-terminated and carboxyl-terminated diene rubbers may also be used. These preferably also contain nitriles and other monomers of the type described above for the low-molecular weight polymer. Preparation of these liquid rubbers are described for example in U.S. Pat. No. 3,285,949 and Canadian Pat. No. 741,818.

The diene-nitrile polymers are normally prepared in aqueous systems using free-radical catalysts as is well known and described in the art. Methods of preparing low-molecular weight copolymers are also well known and described in the art and may also be prepared in emulsion, dispersion or solution.

The polar monomer is polymerized in the presence of, or as is often stated, grafted onto, a mixture of the above two polymers by methods known to those skilled in the art. The polar monomers contemplated are preferably acrylonitrile and/or methacrylonitrile and may also include alkyl esters of acrylic acid, alkyl methacrylates, the styrenes as styrene, vinyl toluene, halostyrenes, vinylidene chloride, vinyl acetate and like vinylidene monomers having a terminal $CH_2=CH<$ group. The amount of polar monomer, preferably at least one nitrile, polymerized onto the mixture of the elastomer and low-molecular weight polymers is from about 2 to 30 weight percent and preferably 5 to 20 weight percent based on the weight of the mixture of elastomer and liquid polymer. It has been found, quite unexpectedly, that essentially gel-free polymers are obtained when a mixture of acrylonitrile, methacrylonitrile and/or methyl methacrylate are employed in ratios, for example, of acrylonitrile/methacrylonitrile-0/100 to 60/40, or acrylonitrile/methyl methacrylate-100/0 to 50/50.

The polymerization of the polar monomer onto the elastomeric low-molecular weight polymer mixture may be conducted in solvent or in aqueous systems. When solvents are used, the solvent should be one that the diene-nitrile-type rubbers are soluble in such as toluene, xylene, benzene, chlorobenzene and the like. In such systems the elastomer and low-molecular weight polymer are dissolved in the solvent and there is then added the polar monomer, in amount of about 0.1 to 5 times the weight of the total polymers, and preferably from about 0.2 to 2.5 times the amount of the weight of the elastomer and the low-molecular weight polymer. Preferably, an excess of the polar monomer is employed. Normally there is used a molecular weight modifier, preferably of the mercaptan-type, including alkyl mercaptans, alkyl mercaptoacetate or mercaptoacetate, diisopropyl xantogen disulfide, wherein the alkyl groups in the mercaptan contain 6 to 14 carbon atoms, and 1 to 8 in the mercaptoacetate. About 0.1 to 5 weight parts per 100 of elastomer and low-molecular weight polymer are used.

The polymerization of the polar monomer is initiated by any of the known free radical catalysts for vinyl polymerization. Usually peroxide systems are employed such as benzoyl peroxide, benzoyl peroxide-dimethylaniline, isopropyl percarbonate, cumene hydroperoxide and the like. The amount of peroxide employed may vary from about 0.1 to 5 parts, preferably from 0.5 to 3 weight parts per 100 weight parts of elastomer and low-molecular weight polymer. The reaction temperature may be varied from about 5 to 100° C., and preferably 30° to 70° C., normally depending on the peroxide used.

The resulting copolymers may be recovered by an conventional technique. Normally when the desired degree of copolymerization has been reached reaction is terminated as by quick cooling or the addition of the usual shortstopping materials to the system. Stabilizers such as phenols, amines, phosphates and the like may be added and the product isolated as by steam distillation, coagulation and other conventional techniques.

The copolymers prepared in accordance with this invention are readily cured with sulfur and sulfur-containing vulcanizing agents as well as other cross-linking agents including peroxides. Polymers are compounded in standard recipes known to those skilled in the art with fillers, lubricating agents, pigments including carbon black and coloring agents, antioxidants, antiozonants and conventional compounding ingredients generally determined by those skilled in the art depending on the end use of the vulcanized product.

EXAMPLE I

A stirred polymerization vessel fitted with a reflux condenser, thermometer, nitrogen inlet and water bath was flushed with nitrogen. 50 Grams of Hycar 1024 (20 percent by weight of acrylonitrile and 80 percent by weight of butadiene-1,3) having a Mooney value of 50 ML-4 at 212° F. was dissolved in 450 grams of toluene in the reactor. 12.2 Grams of acrylonitrile, 2.2 grams of ethyl mercaptoacetate, 1.5 grams of benzoyl peroxide and 0.48 gram of dimethylaniline were charged under nitrogen pressure. After 4 hours the reaction was terminated with 1 gram glacial acetic acid and 1 gram of p-methoxyphenol and 1 gram of 4-methyl-2,6-di-t-butylcresol added. The graft product was isolated by steam distillation and dried. Two other polymerizations were conducted using the same recipe and procedure except that in one run 10 weight parts of a copolymer containing 72 weight percent butadiene-1,3 and 8 weight percent acrylonitrile having a molecular weight of 2,000 was used with 90 weight parts of Hycar 1024. The third run was made with 15 weight parts of the low-molecular weight copolymer with 85 weight parts of the Hycar 1024. The resulting products were compounded to the following recipe, graft rubber—100 weight parts, phenyl-β-naphthylamine—2 weight parts, stearic acid—2 weight parts, zinc oxide—5 weight parts, FEF carbon black—40 weight parts, tetramethylthiuram disulfide—3.50 weight parts. Following are the physical properties of these three polymers.

| Polymer | 1 | 2 | 3 |
|---|---|---|---|
| Hycar 1024 (weight %) | 100 | 90 | 85 |
| Liquid Copolmyer (weight %) | 0 | 10 | 15 |
| % Acrylonitrile grafted | 14 | 14 | 14 |
| ML-4—212° F. | 116 | 83 | 86 |

Cured at 338° F. for 10 minutes

| Polymer | 1 | 2 | 3 |
|---|---|---|---|
| 100% Modulus—p.s.i. | 550 | 800 | 600 |
| 300% Modulus—p.s.i. | 2,080 | 2,480 | 2,200 |
| Tensile Strength—p.s.i. | 2,280 | 2,330 | |
| Elongation—% | 345 | 315 | 305 |
| Hardness—Durometer A | 74 | 80 | 79 |

Air Aged at 250° F. for 3 days

| Polymer | 1 | 2 | 3 |
|---|---|---|---|
| 100% Modulus—p.s.i. | 1,250 | 1,380 | 1,210 |
| Tensile Strength—p.s.i. | 2,950 | 2,650 | 2,500 |
| Elongation—% | 250 | 205 | 210 |
| Hardness—Durometer A | 83 | 85 | 85 |
| Compression Set—212° F. for 70 hours | 50 | 35.7 | 37.5 |
| Gehman Freeze—°C. | −41.5 | −42 | −41.5 |
| Volume Swell 03 Oil 3 days at 212° F. | 41.6 | 34.5 | 33.5 |

It is obvious from these data that an improved material and improved elastomer is obtained and prepared in accordance with this invention. As compared to adding 14 percent acrylonitrile to the elastomer alone, the product grafted onto the mixture of the elastomer and low-molecular weight polymer has a lower Mooney, has better processing characteristics, improved stress strain data, better resistance to air aging, better compression set and improved resistance to oil without the freeze point being raised. Improved polymers are also obtained with a copolymer of isoprene containing 15% acrylonitrile as the base elastomer.

EXAMPLE II

To illustrate the use of other low-molecular weight polymers, a carboxyl-terminated polymer (CTBN) was used containing 75 weight percent butadiene and 25 weight percent acrylonitrile, molecular weight 3600 and carboxyl-terminated; and a xanthate-terminated polymer (XTBN) containing 82 weight percent butadiene and 18 weight percent acrylonitrile, molecular weight of 3600. The following recipes were used and the polymerization conducted as described in example I.

| Polymer | 4 | 5 |
|---|---|---|
| Hycar 1024—grams | 45 | 41 |
| Toluene—grams | 417 | 386 |
| CTBN—grams | | 10 |
| XTBN—grams | 5 | |
| Acrylonitrile—grams | 122 | 122 |
| Ethyl mercaptoacetate—grams | 2.2 | 1.1 |
| Benzoyl peroxide—grams | 1.5 | 1.5 |
| Dimethylaniline—grams | 0.67 | |
| Reaction temperature—°C. | 30 | 65 |
| Weight % Graft Acrylonitrile | 13.5 | 7 |
| Reaction time—hours | 5.5 | 4.5 |
| ML-4—212° F. | 76 | 96 |
| Gehman Freeze—°C. | −42 | −41 |
| Compression Set | 45 | 39.9 |

These two polymers were compounded as described in example I and cured at 338° F. for 10 minutes. The following stress strain data were obtained, both before and after air aging for 3 days at 250° F.

| Polymer | 4 | 5 | Air Aged 4 | 5 |
|---|---|---|---|---|
| 100% Modulus—p.s.i. | 510 | 420 | 1,450 | 1,050 |
| Tensile Strength—p.s.i. | 2,330 | 1,950 | 2,630 | 2,100 |
| Elongation—% | 355 | 335 | 190 | 195 |
| Hardness—A | 78 | 70 | 86 | 78 |

EXAMPLE III

Essentially gel-free graft polymers are prepared using mixtures of acrylonitrile and methacrylonitrile, acrylonitrile and methyl methacrylate and methacrylonitrile and methyl methacrylate. Two polymers are prepared as follows following the procedure of example I.

| Polymer | 6 | 7 |
|---|---|---|
| Hycar 1024—grams | 51 | 51 |
| XTBN—grams | 9 | 9 |
| Toluene—grams | | 452 |
| Benzene—grams | 436 | |
| Acrylonitrile—grams | 105 | 60 |
| Methacrylonitrile—grams | | 60 |
| Methyl methacrylate—grams | 15 | |
| Ethylmercaptoacetate—grams | 1.8 | 1.3 |
| Benzoyl peroxide—grams | 2.5 | 2.5 |
| Dimethylaniline—grams | 1.25 | |
| Time—hours | 3 | 6.5 |
| Temperature—°C. | 40 | 70 |
| % Graft monomer | 18.0 | 10.7 |
| ML-4—212° F. | 73 | 90 |
| Gel Content | 2.0 | 3.2 |

Gel was determined on 0.4 gram of polymer in 100 ml. of 50/50 toluene/dimethyl formamide. These two graft polymers were compounded to the recipe set forth in example I and vulcanized for 10 minutes at 338° F. The physical properties were as follows:

| Polymer | 6 | 7 |
| --- | --- | --- |
| 100% Modulus—p.s.i. | 510 | 400 |
| 300% Modulus—p.s.i. | 2,320 | 1,950 |
| Tensile Strength—p.s.i. | 2,320 | 2,120 |
| Elongation—% | 300 | 330 |
| Hardness A | 68 | 65 |
| Oil Swell | 36.0 | 40.2 |
| Gehman Freeze—°C. | −41 | −41 |

EXAMPLE IV

To demonstrate how the Mooney viscosity may be controlled without loss of other desirable properties, a series of polymerizations were conducted as described in example I with Hycar 1024 of varying Mooney and the XTBN of example II. In the table given below are the Mooney values of two different Hycar 1024's, the ratio of the XTBN mixed with the Hycar 1024, the Mooney of the graft product and the percent acrylonitrile grafted. The Mooney is large rotor and the value taken at 4 minutes at 212° F.

| Polymer | 1 | 2 | 3 | 4 | 5 | 6 |
| --- | --- | --- | --- | --- | --- | --- |
| Ratio Hycar 1024/XTBN | 60/40 | 85/15 | 100/0 | 60/40 | 85/15 | 100/0 |
| Hycar 1024—Mooney | 50 | 50 | 50 | 27 | 27 | 27 |
| Graft product—Mooney | 43.5 | 91 | 120 | 22.5 | 62 | 100 |
| Percent acrylonitrile—grafted | 9.4 | 10.2 | 10.8 | 10.4 | 11.5 | 10.6 |

Thus, by a selection of the Mooney value of the starting nitrile elastomer, and the ratio of liquid polymer, and the level of and the percent of acrylonitrile grafted, the Mooney of the final product is readily controlled.

The rubber polymers of this invention find many applications where the low-temperature properties, solvent resistance and good processability are required or desirable. For example, O-rings tubing, hose, coatings on fabrics or cords, to impregnate fabrics and the like.

I claim:
1. A polymer composition comprising (1) about 60 to 95 percent of an elastomer containing a nitrile copolymerized with a major portion of a conjugated diene, (2) about 5 to 40 weight percent of a polymer containing a major proportion of a conjugated diene and a nitrile and having a molecular weight of about 1,000 to less than 20,000 and (3) a nitrile copolymerized with (1) and (2) in amount from about 2 to about 30 weight percent of (1) and (2).

2. The composition of claim 1 wherein (1) is a copolymer of butadiene-1,3 containing about 10 to 30 weight percent acrylonitrile, (2) is a copolymer of butadiene-1,3 and acrylonitrile in amount from about 10 to about 40 weight percent and the molecular weight is below 5,000 and (3) is selected from the group consisting of acrylonitrile, methacrylonitrile and mixtures of acrylonitrile, and methacrylonitrile with methyl methacrylate.

3. The polymer composition of claim 2 wherein (1) contains about 15 to 25 weight percent acrylonitrile, (2) contains about 20 to 40 weight percent acrylonitrile and is present in amount of about 10 to 20 weight percent with 80 to 90 weight percent of (1), and is acrylonitrile in amount from about 10 to 20 weight percent.

4. The composition of claim 2 wherein (3) is selected from the group consisting of acrylonitrile, methacrylonitrile and methyl methacrylate in ratios of acrylonitrile to methacrylonitrile of 0/100 to 60/40 and acrylonitrile/methyl methacrylate in ratios of from 100/0 to 50/50.

5. A method for preparing improved polymers comprising polymerizing, in the presence of a mixture of (1) 60 to 95 weight percent of an elastomer containing a major proportion of a conjugated diene and a nitrile and (2) about 5 to 40 weight percent of a polymer containing a major proportion of a conjugated diene and nitrile and having a molecular weight of about 1,000 to less than 20,000, a nitrile copolymerized with (1) and (2) in amounts to provide an amount copolymerized with (1) and (2) of about 2 to 30 weight percent of said nitrile, said polymerization conducted with a free-radical catalyst, a mercaptan modifier and from 0.1 to 5 times the total weight of (1) and (2) of the nitrile so that an excess of nitrile is charged over that desired to polymerize with (1) and (2).